(12) United States Patent
Lara et al.

(10) Patent No.: US 6,419,826 B1
(45) Date of Patent: Jul. 16, 2002

(54) SELF-CLEANING FILTER

(75) Inventors: Manuel Garcia Lara; Juan Mesado Terrones; Diego García de Dionisio Contreras, all of San Gines Murcia (ES)

(73) Assignee: Wind, S.L., Murcia (ES)

( * ) Notice: Subject to any disclaimer, the term of this patent is extended or adjusted under 35 U.S.C. 154(b) by 0 days.

(21) Appl. No.: 09/764,998

(22) PCT Filed: Jul. 24, 1998

(86) PCT No.: PCT/ES98/00218
§ 371 (c)(1),
(2), (4) Date: Apr. 18, 2001

(87) PCT Pub. No.: WO00/04974
PCT Pub. Date: Feb. 3, 2000

(51) Int. Cl.[7] .......................... B01D 29/46; B01D 35/22; B01D 29/68; B01D 29/74
(52) U.S. Cl. ........................ 210/304; 210/352; 210/354; 210/356; 210/411; 210/488
(58) Field of Search ................................. 210/411, 488, 210/354, 356, 352, 304

(56) References Cited

U.S. PATENT DOCUMENTS

| | | |
|---|---|---|
| 4,123,356 A | 10/1978 | Sugimoto et al. |
| 4,552,655 A | 11/1985 | Granot |
| 4,655,910 A | 4/1987 | Tabor |
| 4,707,259 A | 11/1987 | Doucet |

FOREIGN PATENT DOCUMENTS

| | | |
|---|---|---|
| EP | 0 347 477 | 12/1989 |

*Primary Examiner*—Thomas M. Lithgow
(74) *Attorney, Agent, or Firm*—Oblon, Spivak, McClelland, Maier & Neustadt, P.C.

(57) ABSTRACT

Improved self-cleaning filter, comprised of a casing (1) with an entry (2) for water towards an encircling chamber (5), a filtering element based on a plurality of grooved disks (10), an axial passage (14) in the breast of these disks and an axial exit (9) for clean water. The filtering element (10) is completed in its lower end by a flap (11) that closes the axial passage (14) in the backward movement of water during cleaning, forcing it to go through side collectors (15) unaffected by the flap (11) and in which established are windows (16) for the exit of water, obliquely oriented in a side direction to make the disks (10) rotate during cleaning, also oblique in a vertical direction to take advantage of the separation between the disks (10) and distributed helically (15), the support tower (6) of these disks completed in a retractile rammer (21).

7 Claims, 5 Drawing Sheets

SELF-CLEANING FILTER

OBJECT OF THE INVENTION

The present invention IMPROVED SELF-CLEANING FILTER refers to a series of improvements introduced into self-cleaning filters, for example filters for water cleaning, where the self-cleaning process is carried out by means of a temporary reversal in the direction of the water flow that intersects it.

The improvements for the invention have as an objective to minimize water consumption during this self-cleaning process, improving the cleaning conditions of the filtering disks, especially in the face of residuals of an adherent type, and facilitating their disassembly in the recurrent and indispensable manual deep cleaning operations.

BACKGROUND OF THE INVENTION

The State of the Art, in what refers to self-cleaning filters, has undergone a rapid evolution in past times, fundamentally due to the development of its utilization in watering applications.

Known by the public in general is the advance reached in achieving a better usage of water resources, especially in regions characterized by a natural shortage of water. To this sense, we can cite as examples of this type of mentioned techniques, watering by sprinklers and watering by microspray. All of these modern techniques achieve a high degree of water usage. On the other hand, it is also obvious that more and more one turns to the use of poor quality waters, which frequently have impurities, and although these do not constitute an inconvenience in traditional watering techniques, they can be a serious problem in watering installations with sprinklers and micro-spray. For this reason, it is necessary to place filters, which prevent as much as possible the entry of impurities, brought by the water flow to the described watering installations with sprinklers and micro-spray.

The problem that arises then, with the usage of filters, is the one derived from the necessary cleaning and maintenance procedures associated to its operation, to eliminate the impurities accumulated in them.

With regards to this, self-cleaning filters have been known for some time, in which, starting from a cylindrical sensitive casing, placed inside the same are two coaxial chambers, a perimeter and an axial one, connected to each other through a plurality of filtering disks provided with grooves on their faces that are sometimes radial and sometimes oblique, so that when these disks are superimposed onto each other, the mentioned grooves become conduits of a reduced caliber, which are what confer to the device the filtering effect.

U.S. Pat. No. 4,707,259, describes a counter-current flow filter including a plurality of ring shaped filter elements placed one on top of the other forming an assembly of a generally cylindrical shape fastened to a cylinder, which are cleaned by counter current flow of a liquid through the mentioned elements. The filter includes a stopping mechanism to prevent the filter elements from vibrating during the filtration, but when the filter is being cleaned the stopping mechanism allows the filter elements vibration.

In European Patent EP0347477 a disk filter including a housing defining a fluid inlet and a fluid outlet is described. The filter element defines an upstream surface communication with the fluid inlet and a downstream surface communicating with the fluid outlet with a hollow volume interior limited by the disks that form the filter element.

In this type of filter, the encircling or external chamber is coupled to the corresponding water entry, generally radial, while the axial chamber is connected in turn to the flow exit for the filtered water, generally in an axial position, so that the water, conveniently pressurized, reaches the perimeter chamber in the first place, passes through the disks to reach the axial chamber, producing its filtering, and finally leaving the filter through the axial exist of the same.

Obviously the mentioned filtering conduits are damaged with dirt and with time, for which periodic cleanings of the same are necessary, for this reason it is also common to reverse the water flow direction, so that clean water enters through the flow exit, passing between the disks and carrying the dirt deposited in the same towards the usual entry mouth. Also known, to facilitate this maneuver, is that the disks be separated during the self-cleaning maneuver, to facilitate the detachment and carrying of the dirt.

This singularity makes these filters widely used, especially in countries where the cost of the manpower necessary for cleaning the filter is high, thereby those that are self-cleaning are preferred.

This structure brings an extensive and varied problem that centers mostly on the following aspects:

- During the cleaning or self-cleaning phase an excessive consumption of water exists, for which the entire circulating flow, when reversed, becomes waste water.
- In sewage waters and in those with a high degree of particles in suspension, the number of necessary cleanings is very high, and together with the waste of water in each cleaning, which is mentioned in the previous paragraph, makes the system very expensive.
- The fixture rigidity of the mechanisms constituent of the filter to the corresponding support casing, hinders its disassembly when it is necessary to effect a manual deep cleaning, a maneuver that obviously must be repeated cyclically.
- When the pollutants of the water to be filtered are of an adherent type, for example algae remains, the simple reversal of the flow causes an insufficient cleaning of the filtering disks, which forces shorter self-cleaning cycles, and more frequent manual deep cleaning operations.

For all of this, it is evident that the self-cleanings filters known in the State of the Art leave a considerable number of inconveniences without solving, for which improvements have been devised that make up the present improved self-cleaning filter that is described next.

DESCRIPTION OF THE INVENTION

With regards to the previously explained, the improvements that the invention proposes have been conceived in order to fully solve in a satisfactory manner the previously expressed problems, in their different commented areas.

Thereby, the present improved self-cleaning filter is composed of a basic structure, similar to other filters of this type, constituted by an external chamber, to which the water entry is coupled, in whose interior is located an axial chamber that communicates with the conduit or exit mouth, both chambers being defined by a framework of disks, found inside this external chamber, and the interior chamber is constituted by the interior of the disks or filtering rings.

One of the peculiar characteristics of the present self-cleaning filter is constituted by the support tower of the disks, that makes up the mentioned disk framework, whose end corresponding to the exit of clean water is completed by a seat base for a flap that acts as a stopper for the axial passage of the water, a flap that tends to act in a closing manner through a spring, conveniently impeded to allow opening the same during the normal flow of water when the filter acts as such, but automatically causing a closing action when the flow reversal takes place during the self-cleaning.

This flap is framed by a perimeter alignment of collectors, preferably in fours, that are not affected by the same and that establish the backward moving water flows during the self-cleaning phase, the collectors having for such a purpose orifices or windows for the exit of water specially directed towards the disks, allowing to cleanly select a small jet for each disk, with the object of achieving greater effectiveness in the self-cleaning phase of the water flow direction reversal.

This way, the water flow during the self-cleaning is considerably reduced with regards to the water flow under filtering conditions, this flow change automatically taking place in the flow reversal for cleaning.

In the same way, another singular characteristic of the present improved self-cleaning filter is constituted because the support tower of the filtering disks is completed in its end opposite the mentioned flap with a rammer that keeps the filtering disks conveniently separated during the filtering, this rammer being axially moveable against the tension of a spring, so that this mechanism pressing the disks, before an external action of any type, for example before a pneumatic pressure against the mentioned spring, allows the necessary separation between the filtering disks, to improve their cleaning, but all of this without producing a variation in the longitudinal dimension of the filtering element, which will be exactly the same in both the filtering phase and in the cleaning phase, which allows an easier coupling of the same to any casing type, since it does not require anything beyond the closing pressure of the latter to remain stable in its interior, allowing an extremely quick and simple extraction.

Besides the aforementioned, in the present improved self-cleaning filter it is provided that the orifices or windows of the self-cleaning collectors are adapted in a tilted position, so that the jets of water generated in each one impact obliquely on the disks, achieving two different and complementary effects, on the hand the elevation and consequent separation between the disks, and on the other the cleaning of the same, the first effect specifically due to the vertical component and the second to the horizontal component, tangential to the external surface of the filtering disks framework, to the force vector that sets the water flow.

It has also been provided that the windows be of a rectangular shape and that, considering the collectors in their entirety, they describe a helical path, which, on the one hand, contributes to the rising effect of the disks and, on the other, makes the cleaning water sweep the entire surface of the same.

The special incidence angle of the cleaning flows on each disk, also causes the rotation of the same, making the disks rotate freely removing the impurities and particles registered in the filtering process, which also contributes to improving the cleaning conditions.

Finally, and in accordance with another characteristic of the invention, it is provided that in the perimeter chamber defined on the outside of the disks, to which the water has access at first during the filtering phase, established, in the entry end will be helical deflectors that generate, due to the dynamic flow of water, a high turning speed of the same inside this chamber, that leads, by centrifugal force, to a displacement of the solid particles in suspension towards the casing wall, that is to say, to a lodging of the same with regards to the filtering block, which directly affects in an important way the time it takes to obstruct the filtering element, or what is the same, it makes the number of necessary cleanings lessen considerably, as these particles in suspension remain in the external limits of this chamber, without reaching the filtering rings.

DESCRIPTION OF THE DRAWINGS

To add to the description that is being rendered and with the object of helping to better understand the characteristics of the invention, in accordance with a preferable example of a practical execution of the same, accompanying as an integral part of this description is a set of drawings with an illustrative and non-limiting nature, where the following has been represented.

PREFERED EMBODIMENT OF THE INVENTION

Figure 1:
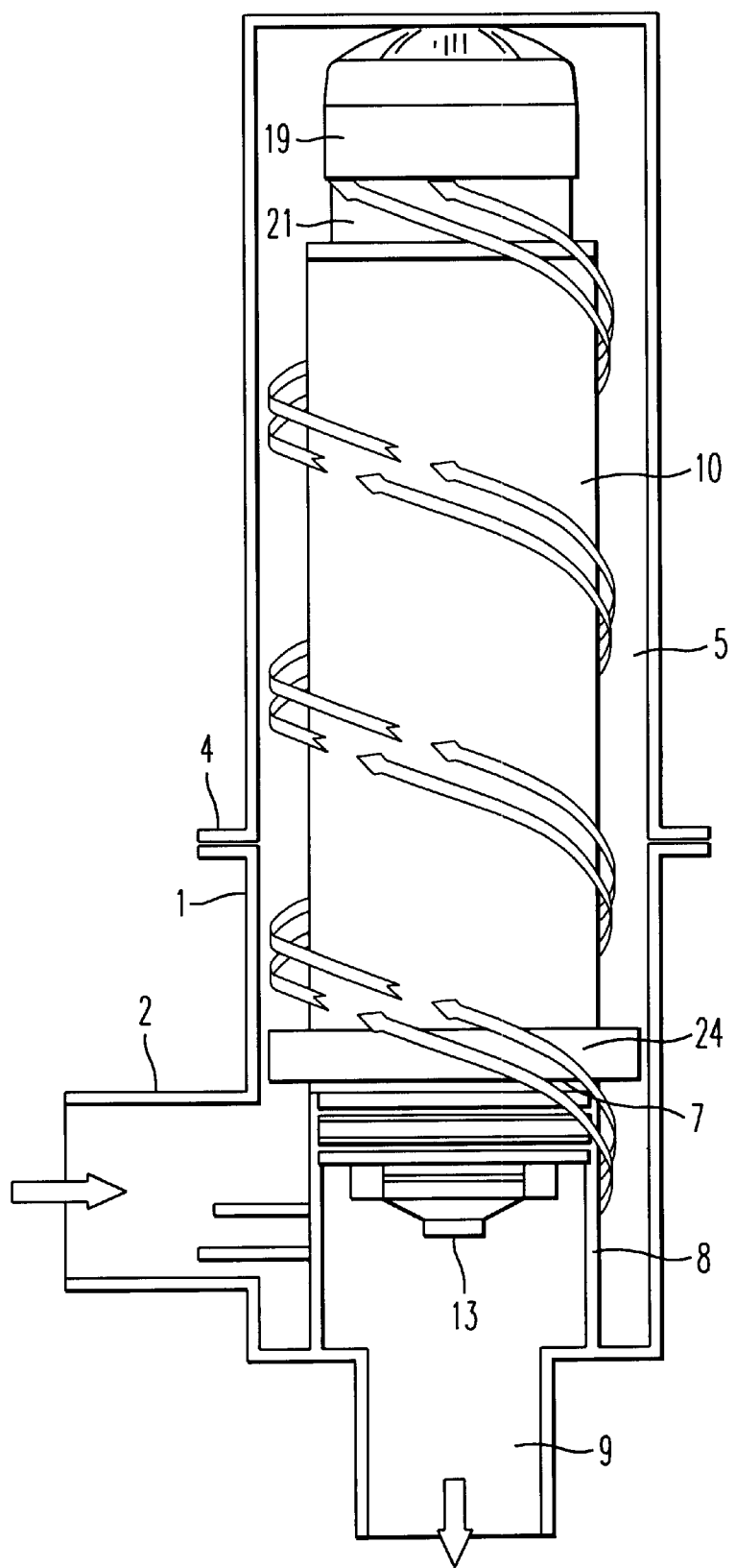
FIG. 1. View of a schematic representation in a side elevation of an improved self-cleaning filter carried out according to the characteristics object of the present invention, with its casing cut open to show with more clarity a part of its interior structure.
Figure 3:
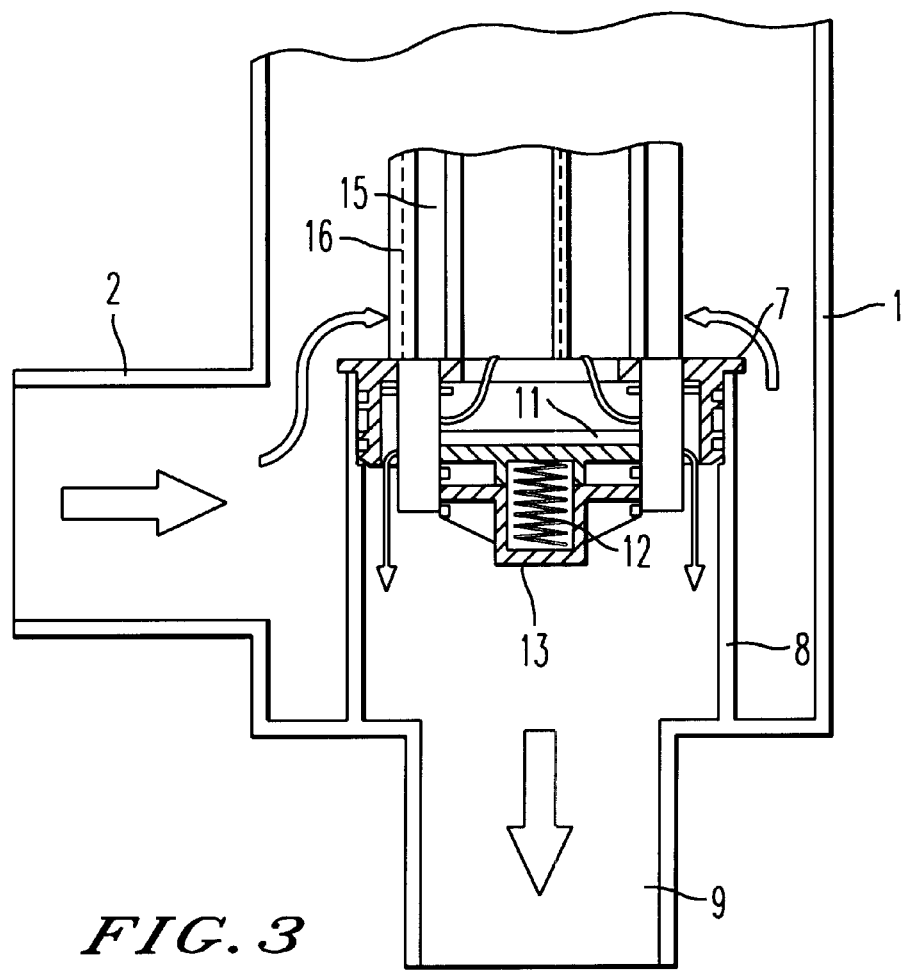
FIG. 3. Detail of the lower part of the filter from the previous figure, but in an opposite situation to that of FIG. 2, that is to say, in a filtering situation.
Figure 4:
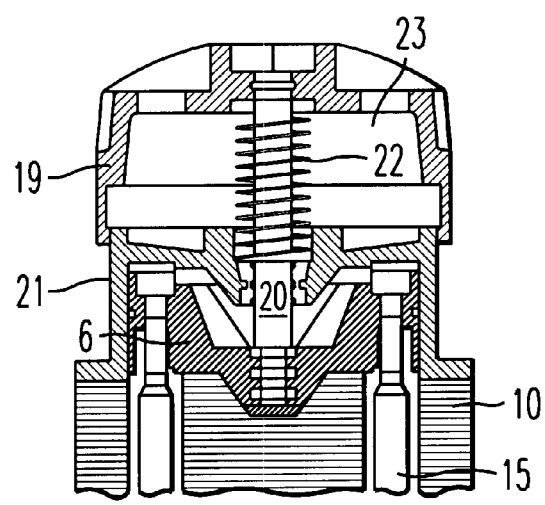
FIG. 4. Detail of the upper part of the filter in FIG. 2, but in an opposite situation, that is to say, in a filtering situation.
Figure 5:
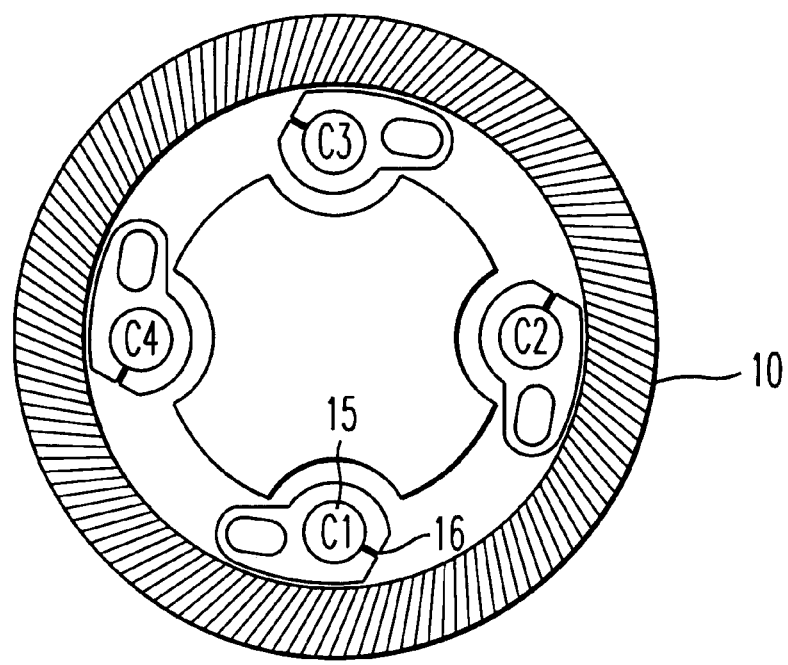
FIG. 5. Detail in a cross-section of the filtering element at the level of one of the disks that partake in the same.

From these figures one can observe how an improved self-cleaning filter, rendered according to the characteristics of the invention, is structured, like any conventional filter of this type, with the help of a cylindrical casing (1), where in one of the ends an entry is established (2) for the water to be filtered, casing (1) that is enhanced by a cover (3) conveniently fixed to it by means of a perimeter flange (4) or by any other means, defining the casing (1–3) is a chamber (5) in whose breast lies the filtering group manifested in a tower (6) that through its end close to the entry (2) is completed in a base (7) coupled tightly to a neck (8) that frames the exit conduit (9), in an axial position, establishing on the mentioned tower (6) a plurality of disks (10) providing oblique grooves in their faces, as especially observed in FIG. 5, so that between these disks, conveniently inter-coupled, as observed in FIGS. 1 and 4, the passage of water is produced for the filtering of the same, according to the arrows represented in FIG. 3.

Figure 2:
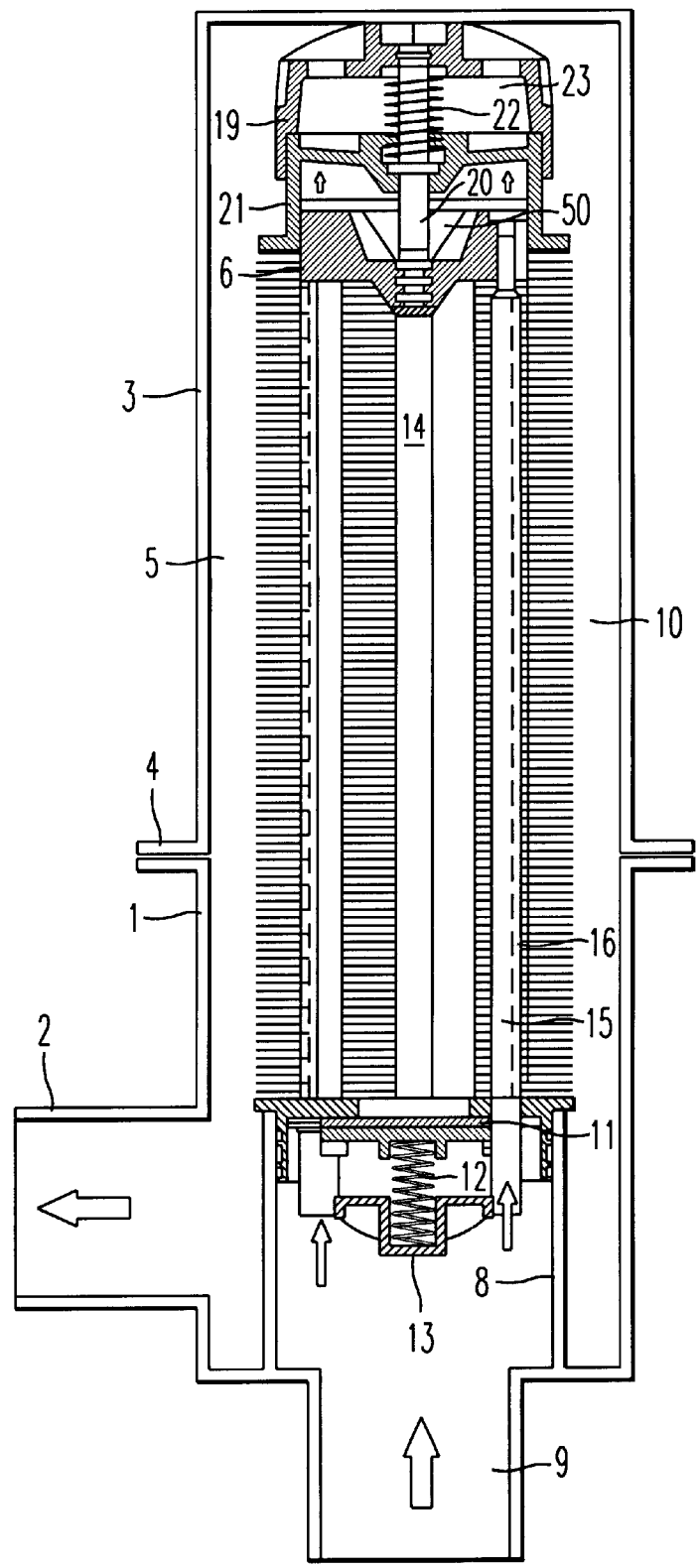
FIG. 2. View in a side elevation, similar to that of FIG. 1, of the same filter in the previous figure in a longitudinal section and with the flow indicating arrows of the self-cleaning phase, that is to say in a phase opposite the one shown in the previous figure.

Well then, starting from this basic structure and according to the invention, the base (7) of the tower (6), constitutes the seat for a flap (11) qualified to stop the axial passage (14)

through which the water, after passing through the disks (10), is directed towards the exit (9), flap (11) that tends to permanently act in a closing manner through a spring (12) arranged between this flap (11) and a fixed support (13), so that the tension of the mentioned spring (12) is enough to displace the flap (11) against the seat (7) into a closing action, when the flow of the water is reversed, as shown in FIG. 2, during the cleaning phase, whereas under normal filtering usage conditions, the pressure with which the water reaches the axial passage (14) is enough to counter the spring's tension (12) so that the flap (11) adopts an opening position allowing the free passage of water towards the exit (9).

In the tower (6) a plurality of collectors (15) participate, four in the practical execution example represented in the figures, each one of which is extended downwards with regards to the seat base (7), so that it is not affected by the closing flap (11), these collectors (15) acting as a retreating mechanism for the cleaning water, limiting the flow to its own section, for which, under such conditions, the flap (11) maintains the axial passage (14) closed.

Each one of these collectors (15) has a longitudinal alignment of windows (16) that, as one especially observes in FIG. 5, adopt an obviously tilted position with regards to the radius corresponding to the filtering element, and with the purpose that the jet of water generated through each hole or groove (16) impacts obliquely on the disks (10), forcing them into a revolving movement when they are separated from each other, as will be seen later on.

Figure 6:
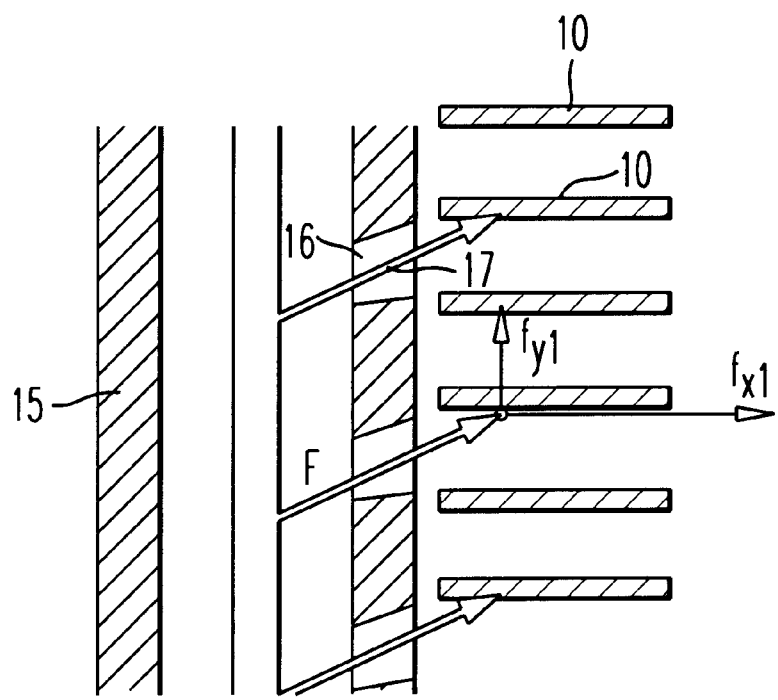
FIG. 6. Enlarged detail in section of one of the self-cleaning collectors, where represented are the vectors corresponding to the jets of water acting on the filtering disks and the decomposition of these vectors when impacting on the latter.
Figure 7:
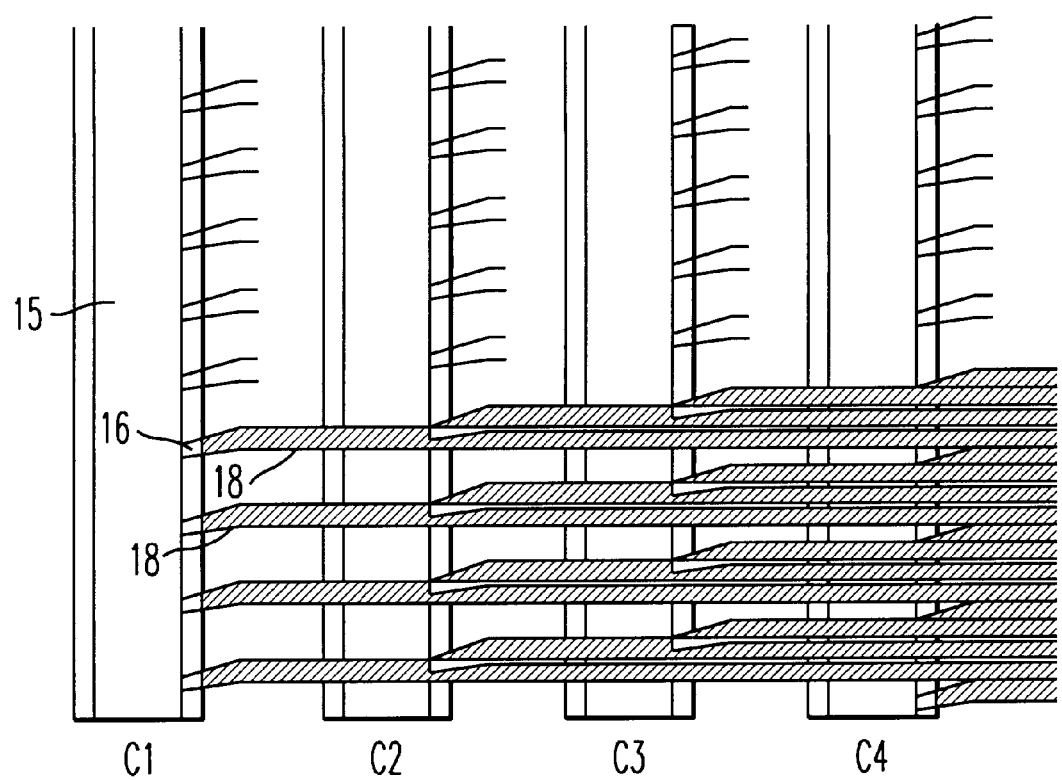
FIG. 7. Diagram corresponding to the cascading operability of the jets of water that emerge from the different collectors during the self-cleaning process.

Also, the mentioned orifices (16), as observed in FIG. 6, also adopt a tilted position with regards to the disk planes (10), so that the corresponding jet of water (17) impacts on the lower face of these disks (10), unfolding their vector into two vectors, a vector parallel to the lower face of the disk, that causes the sweeping and consequently the cleaning of the same, and another perpendicular vector that causes a separation between the disks, adopting these the floating situation shown in FIG. 2.

It has also been provided that the mentioned orifices or windows (16) adopt a rectangular shape so water curtains are generated due to the spin of the disks (10) and because of the location of the orifices or windows (16) in the different collectors (15). The windows (16) are not at the same height as the immediate upper or lower window (16) from the next collector (15), in such way the windows (16) in different collectors (15) create an imaginary helical path around them (15). Such a lay out results in the different water curtains generated by the windows (19) creating a helical water curtain that wets all the disks uniformly. The helical water curtain makes the cleaning operation easier and more effective helping the disk separation and avoiding any disk remaining dry and dirty.

To allow this axial separation between the disks (10), according to the position represented in FIG. 2, the tower (6) is provided to be completed in its upper end by a head (19), axially connected to this tower by an axial rod (20) where a rammer is telescopically set (21), acting as a piston that under normal filtering conditions rests on the pile of disks (10), as shown in FIGS. 1 and 4, keeping these disks in a situation of maximum closeness to each other, through a spring (22) that tends to displace this rammer (21) towards the disks, while during the self-cleaning phase and, for example, when applying pressure inside the chamber defined between the end of the tower (6) and the rammer (21), the tension of the spring is countered (22) and the rammer rises (21) towards the situation of separation between disks (10) shown in FIG. 2.

Finally, and as a complement to the described structure, in the lower end of the encircling chamber (5), immediately following the entry (2) and as a perimeter continuation of the base (7) of the tower (6), established are a plurality of helical deflectors (24) that force the fluid, through its own dynamic flow, to a high turning speed, according to the arrows represented in FIG. 1, which in turn originates, as previously said, that through centrifugal force the solid particles in suspension that previously dirtied the filtering element determined by the set of disks (10), are deposited on the casing (1–5) of the filter, not coming close to said filtering element and achieving a substantial lengthening of intervals between successive self-cleanings, with the consequent water savings that this implies, besides the filter being out of service less time.

On the other hand, and for manual cleanings in a long term, it is enough to open the flange (4) and to remove the cover (3) of the casing, so that the filtering element, without requiring any other disassembling maneuver, is directly accessible without more than "unplugging" the tower (6) of the casing neck (8).

It is not considered essential to make this description more extensive so that any expert in the subject understands the scope of the invention and the advantages that are derived from the same.

The materials, shape, size and position of the elements will be susceptible to variations, provided this does not imply an alteration in the essence of the invention.

What is claimed is:

1. A self-cleaning filter comprising:
   a casing inside of which is a filtering framework including a plurality of piled up grooved discs supported on a seat base;
   an encircling section between said pile of discs and said casing, said encircling section configured to receive a fluid during a filtering phase from a radial entry located in one end of the casing, the fluid passing through said discs towards an axial exit conduit;
   a rammer that under normal filtering conditions acts, by action of a spring, on the pile of discs tending to keep them linked resting on said seat base, said rammer being retractile against said spring;
   a chamber defined between a fixed part and said rammer so that when a reverse flow of fluid enters the filter by said axial exit conduit the fluid reaches said chamber to counter tension of said spring and release the filtering discs allowing an axial separation thereof, the reverse flow providing a self-cleaning effect, by discharging the fluid in jet forms so that the jet fluid impacts obliquely, tangential to an external surface of the discs and to make the discs revolve;
   a wide axial free passage defined in said pile of discs through which fluid to be filtered after passing through said discs is directed towards said axial exit conduit;
   a flap tending to permanently close said wide axial free passage acting on said seat base through action of a spring arranged between said flap and a fixed support;
   a plurality of collectors placed around said wide axial free passage and surrounded by said pile of discs, said collectors extending from said seat base to a proximity of said axial exit conduit so that said collectors are not affected by the closing flap which under said conditions maintains said wide axial free passage closed, said reverse flow circulating through said collectors which limit the flow by its own section, and reaching said chamber;

a longitudinal alignment of windows in each of said collectors for the exit of cleaning fluid in the form of jets against the lower face of the discs; and a supporting tower of said discs including said seat base, a plurality of connectors to which said supporting tower is attached, and said fixed support linking said connectors and delimiting said chamber.

2. A self-cleaning filter, according to claim 1, wherein the windows for the exit of cleaning fluid from the collectors adopt a tilted position in an upwards direction, so that the jet of fluid that leaves through the windows impacts on a lower face of the discs separating them due to an upward direction of the jets.

3. A self-cleaning filter, according to claim 1, wherein the windows for the exit of cleaning fluid from the collectors have a rectangular cross-section.

4. A self-cleaning filter, according to claim 1, wherein the windows of the collectors are progressively displaced in height in different collectors so that sweeping of the jets of fluid of the different collectors is helical, said helical paths of cleaning fluid contributing to improve cleaning effectiveness on said revolving discs.

5. A self-cleaning filter, according to claim 1, wherein the supporting tower includes a lower base, a supporting tower flap, and a head which with a corresponding mobile rammer form a group coupled to the casing.

6. A self-cleaning filter, according to claim 5, wherein the casing further includes a removable cover fixed to the casing by a perimeter flange, so that the filtering group remains fixed in the casing in a working position and directly accessible through said removable cover.

7. A self-cleaning filter, according to claim 1, further comprising, in said encircling section a plurality of helical deflectors that establish for the fluid a high-speed helical movement in the encircling section.

* * * * *